United States Patent Office 3,393,995
Patented July 23, 1968

3,393,995
METHOD OF CONTROLLING WEEDS
Wilbur F. Evans, Springhouse, Pa., and Thomas F. Wood, Wayne, N.J., assignors, by direct and mesne assignments, to Givaudan Corporation, Clifton, N.J., a corporation of New Jersey
No Drawing. Filed Sept. 28, 1964, Ser. No. 399,874
6 Claims. (Cl. 71—125)

ABSTRACT OF THE DISCLOSURE

A new class of herbicides is disclosed. The active compounds are substituted indans of the formula:

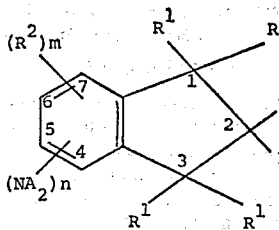

wherein $R^1$ is selected from the group consisting of hydrogen and alkyl radicals of from 1 to 3 total carbon atoms, with the proviso that at least one of the $R^1$'s is hydrogen, and further provided that if dimethyl substitution occurs in both the 1 and 3 positions at least one of the following conditions must prevail:

(a) at least one alkyl substituent having from 2 to 3 carbon atoms in the 2 position, and
(b) an alkyl substituent having from 2 to 5 carbon atoms in the 5 position; $R^2$ is selected from the group consisting of hydrogen, alkyl radicals of from 1 to 5 total carbon atoms and cycloalkyl radicals; A is selected from the group consisting of hydrogen and oxygen; $n$ is an integer of 0 to 2; $m$ is an integer of 1 to 4, and where $m$ plus $n$ is a maximum of 4.

The preparation and application of, and test results obtained with, a number of the compounds are given in 18 specific examples.

---

This invention relates to the use of certain compounds for the purpose of controlling weeds. More particularly, this invention relates to the use of substituted indan compounds of the formula:

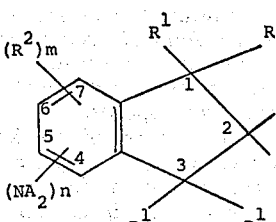

wherein $R^1$ is selected from the group consisting of hydrogen and alkyl radicals of from 1 to 3 total carbon atoms, with the proviso that at least one of the $R^1$'s is hydrogen, and further provided that if dimethyl substitution occurs in both the 1 and 3 positions at least one of the following conditions must prevail:

(a) at least one alkyl substituent having from 2 to 3 carbon atoms in the 2 position, and
(b) an alkyl substituent having from 2 to 5 carbon atoms in the 5 position; $R^2$ is selected from the group consisting of hydrogen, alkyl radicals of from 1 to 5 total carbon atoms and cycloalkyl radicals; A is selected from the group consisting of hydrogen and oxygen; $n$ is an integer of 0 to 2; $m$ is an integer of 1 to 4, and where $m$ plus $n$ is a maximum of 4.

The substituted indan compounds of the present invention have been found to possess high levels of herbicidal activity and are thus useful in controlling undesirable plants of both the monocotyledonous and the dicotyledonous species on a pre-emergence basis. It has also been discovered that the compounds of the present invention possess high rates of herbicidal activity on both emerged and submerged aquatic weed species.

By the term "pre-emergence" is meant that the compound is applied to the soil prior to emergence of the weed species sought to be controlled. This term, as used herein, also includes the application of the herbicidal compound falling within the scope of this invention to areas wherein useful or desirable plants are either growing or have been sown, but wherein the undesirable plants sought to be controlled have not as yet emerged.

In order to illustrate the herbicidal activity of the compounds falling under the purview of this invention there are presented below a series of test results which are reported solely by way of illustration and which are not intended in any way to be construed as a limitation of this disclosure.

EXAMPLE I

Weed seeds of the species wildoats (*Avena fatua*), cheatgrass (*Bromus secalinus*), foxtail (*Setaria fabarii*), barnyard grass (*Echinochloa crusgalli*) and crabgrass (*Digitaria ischaemum*) were planted in fresh soil, under greenhouse conditions, and immediately following planting the soil surface was sprayed with an aqueous-alcohol solution containing the compound 4,6,7-triisopropyl-1,1-dimethylindan at a rate so as to apply an equivalent to 16 lbs. of the active herbicide agent per acre of soil surface. Approximately two weeks after spray application an inspection of the treated area revealed that from 80 to 100% control was obtained over these undesirable plant species as compared to untreated areas.

EXAMPLE II

Weed seeds of the species cheatgrass (*Bromus secalinus*), crabgrass (*Digitaria ischaemum*) and lambsquarter (*Chenopodium album*) were sown in fresh soil, under greenhouse conditions, and immediately following sowing an equivalent of 16 lbs./acre of the compound 1,1,4,5-tetramethyl-7-isopropylindan was applied in the form of an aqueous suspension to the soil surface. Two weeks after spraying the treated area was inspected and it was found that from 70 to 100% control was obtained over the growth of these undesirable weeds.

EXAMPLE III

An equivalent of 16 lbs./acre of the compound 1,1-dimethyl-6-ethyl-5,7-dinitroindan was applied as an aqueous-oil emulsion on a pre-emergence basis to fresh soil wherein there was seeded cheatgrass (*Bromus secalinus*), crabgrass (*Digitaria ischaemum*) and pigweed (*Amaranthus retroflexus*). Approximately two weeks after spray application of the chemical compound an inspection of the treated plots showed from 60 to 70% control over these undesirable weed species.

EXAMPLE IV

An application of the equivalent of 16 lbs./acre of the compound 1,1-dimethyl-6-isopropyl-5,7-dinitroindan was applied as an alcohol-methylated naphthalene solution to an area seeded with crabgrass (*Digitaria ischaemum*). Approximately two weeks after spray application an inspection of the area showed that 90% control was obtained over this undesirable plant species.

EXAMPLE V

Weed species of the varieties cheatgrass (*Bromus secalinus*), foxtail (*Setaria fabrii*), barnyard grass (*Echinochloa crusgalli*), crabgrass (*Digitaria ischaemum*), Johnson grass (*Sorghum halepense*) and pigweed (*Amaranthus retroflexus*) were sown in fresh soil, and immediately following planting, the soil surface was sprayed with an aqueous emulsion of the compound 1,1,4,6-tetramethyl-5,7-dinitroindan so as to apply thereto an equivalent of 16 lbs./acre of soil surface. Two weeks after spray application visual inspection of the treated areas showed from 85 to 100% control of the undesirable weed species.

EXAMPLE VI

An equivalent of 16 lbs./acre of the compound 1,1-dimethyl-4,6-diisopropyl-5,7-dinitroindan was applied in an oil-alcohol solution to an area seeded with crabgrass (*Digitaria ischaemum*). Approximately two weeks after spray application an inspection of the area showed that 90% control was obtained over this undesirable weed species.

EXAMPLE VII

Seeds of the following undesirable grasses wild oats (*Avena fatua*), cheatgrass (*Bromus secalinus*), foxtail (*Setaria faberii*), barnyard grass (*Echinochloa crusgalli*), crabgrass (*Digitaria ischaemum*) and Johnson grass (*Sorghum halepense*) were sown in fresh soil, under greenhouse conditions, and immediately after planting the soil surface was sprayed with an alcohol-acetone solution of the compound 1,1,3,3-tetramethyl-5-ethyl-4,6-dinitroindan so as to apply thereto an equivalent of 16 lbs. of the herbicidal agent per acre of soil surface. Two weeks after spray application an inspection of the treated areas showed that from 80 to 100% control was obtained over these undesirable grass species.

EXAMPLE VIII

An application of the equivalent of 16 lbs./acre of the compound 1,1,3,3,5-pentamethyl-2-ethyl-4,6-dinitroindan was applied as an aqueous suspension to freshly sown cheatgrass (*Bromus secalinus*), crabgrass (*Digitaria ischaemum*) and Johnson grass (*Sorghum halepense*). Two weeks after spraying an inspection of the treated area showed that from 80 to 90% control was obtained over these grass species.

The compounds falling under this invention may be formulated for practical use as herbicides with conventional agricultural carriers in order to obtain the desired concentration of active herbicidal agent and to facilitate handling. For example, these compounds may be formulated into dusts by combining them with such materials as talc or clays. Wettable powder formulations may be obtained by adding a dispersing or suspending agent to the dust formulations referred to above.

If desired, the compounds of this invention may be applied as spray solutions which may be prepared by dissolving the compounds in suitable solvents, such as water, xylene, methylated naphthalenes, kerosenes, or common agricultural oils in accordance with well established agricultural practices. The choice of solvent to be used will be dictated by the solubility of the compound sought to be sprayed in that particular solvent system. Generally, it has been found that the majority of these compounds have a relatively low order of water solubility, so that the use of common agricultural organic solvents is a preferred practice.

The compounds of this invention may also be emulsified or suspended in water by adding wetting agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

So far as concerns the amount of herbicide to be used, this is, of course, determined by such considerations as the type of treatment to be made, the area to be treated, the type of weeds sought to be controlled and the stage of development of the species being sprayed. Generally, however, concentrated herbicidal compositions of the present invention are prepared so as to contain from about 5 to about 60% of the active herbicidal components. Compositions which are suitable for "as is" application generally contain from 0.1% to about 10% of active herbicidal component.

Preferred compounds of the present invention, being highly active herbicides, may be used at relatively low concentrations as may be seen from the following results:

EXAMPLE IX

An acetone-water solution of 1,1,4,6-tetramethyl-5,7-dinitroindan was sprayed over ground newly planted to foxtail (*Setaria faberii*) and crabgrass (*Digitaria ischaemum*) so as to apply an equivalent of 3 lbs. of the active herbicidal agent per acre of soil surface. Approximately three weeks after spray application the treated area was inspected and 90% control was obtained over these undesirable grasses.

If it is desired to effect substantially complete elimination of vegetation through use of one or more compounds of this invention, it is then necessary to apply a higher rate of the chemical agent, for example from 20 to 40 lbs./acre thereof, so as to obtain substantial soil sterilization.

Effective aquatic weed control can be accomplished by very low concentrations of the herbicidal compounds of the present invention as may be demonstrated by the following results:

EXAMPLE X

A rate of 10 parts of the compound 1,1-dimethyl-6-ethyl-5,7-dinitroindan was added to each million parts of water wherein there was growing both floating water ferns (*Salvinia rotundifolia*) and submerged water weeds of the species *Elodea canadensis*. Approximately three weeks after application of the chemical to the water a visual inspection showed that from 90 to 100% control of these aquatic weeds had been obtained as compared with untreated areas.

EXAMPLE XI

A rate of 10 parts of the compound 1,1,4,6-tetramethyl-5,7-dinitroindan was added to each million parts of water wherein there was growing floating aquatic water ferns (*Salvinia rotundifolia*). Approximately three weeks after application of the chemical to the water a visual inspection of the treated area showed that 90% control had been obtained over this weed species.

The compounds found to be suitable for use in the present invention may be prepared by the condensation of a hydrocarbon with an olefin to form a desired indan. While the preparation of these indan compounds forms no part of the present invention, such preparation may be accomplished by various methods, such as for example the methods listed below.

EXAMPLE XII (Preparation of 1,1,4,6-tetramethyl-5,7-dinitroindan)

(Compound of Examples V, IX and XI).—1,1,4,6-tetramethylindan, produced by the cyclo addition of isoprene to meta-xylene in the presence of sulfuric acid, was nitrated with mixed acids prepared from 1,000 grams of 93% sulfuric acid and 336 grams of 98% nitric acid with agitation and cooling to keep the temperature at 17–19° C. during the nitration reaction. Crystals of the product separated during the nitration reaction and the reaction mixture was quenched in 1,000 grams of ice water. The crystalline product was filtered and washed with water and then dissolved in benzene and washed again with water and dilute caustic solution, and again with water to neutrality. A pale yellow, odorless, dinitro derivative, 1,1,4,6-tetramethyl-5,7-dinitroindan was obtained having a melting point of 92–93.5° C.

EXAMPLE XIII (Preparation of 1,1-dimethyl-6-ethyl-5,7-dinitroindan)

(Compound of Examples III and X).—1,1-dimethyl-6-ethylindan, made by the procedure of U.S. Patent 3,078,319, was nitrated with mixed acids following the procedure described in Example XII to produce a pale yellow, colorless, dinitro derivative, 1,1-dimethyl-6-ethyl-5,7-dinitroindan having a melting point of 90–91° C.

EXAMPLE XIV (Preparation of 1,1,3,3-tetramethyl-5-ethyl-4,6-dinitroindan)

5-ethyl-1,1,3,3-tetramethylindan (S. H. Weber, J. Stofberg, D. B. Spoelstra, and R. J. C. Kleipool, Rec. trav. chim., 75, 1441 (1956)) was nitrated with mixed acids, using the operating conditions of Example XII, above, to produce the pale yellow dinitroderivative, 1,1,3,3-tetramethyl-5-ethyl-4,6-dinitroindan having a melting point of 123.5–124.5° C.

*Analysis.*—Calcd. for $C_{15}H_{20}O_4N_2$: C, 61.63; H, 6.90; N, 9.58. Found: C, 61.85; H, 6.82; N, 9.42.

This product is useful as a pre-emergence herbicide.

EXAMPLE XV (Preparation of 1,1,3,3,5-pentamethyl-2-ethyl-4,6-dinitroindan)

2-ethyl-1,1,3,3,5-pentamethylindan, prepared by the procedure of Weber et al., Rec. trav. chim., 75, 1441 (1956) was nitrated with mixed acids, using the operating conditions of Example XII above, to produce the pale yellow dinitroderivative, 1,1,3,3,5-pentamethyl-2-ethyl-4,6-dinitroindan having a melting point of 80.0–81.5° C.

*Analysis.*—Calcd. for $C_{16}H_{22}N_2O_4$: C, 62.38; H, 7.24; N, 9.14. Found: C, 62.20; H, 7.25; N, 8.89.

This product is useful as a pre-emergence herbicide.

EXAMPLE XVI (Preparation of 1,1,3,3,5-pentamethyl-6-ethyl-4,7-dinitroindan)

6-ethyl-1,1,3,3,5-pentamethylindan, prepared by the procedure of Weber et al., Rec. trav. chim., 76, 199 (1957) was nitrated with mixed acids, using the operating conditions of Example XII above, to produce the pale-yellow, odorless, dinitro-derivative, 1,1,3,3,5-pentamethyl-6-ethyl-4,7-dinitroindan having a melting point of 144.4–146° C. The product is active as a plant growth regulant and pre-emergence herbicide.

EXAMPLE XVII (Preparation of 1,1,3,3,5-pentamethyl-6-ethyl-4-(and 7-)nitroindan)

6-ethyl-1,1,3,3,5-pentamethylindan (Weber et al., loc. cit.) was nitrated by the procedure given in Example XII to produce a pale yellow viscous mononitro derivative which could not be induced to crystallize. This crude liquid product is useful, without further purification as a selective pre-emergence herbicide.

EXAMPLE XVIII (1,1-dimethyl-6-cyclohexyl-5,7-dinitroindan)

Cyclo-addition of isoprene (2-methyl-1,3-butadiene) to cyclohexylbenzene in the presence of sulfuric acid was effected by the method disclosed above in Example XII, to produce 6-cyclohexyl-1,1-dimethylindan, a colorless liquid having a boiling point of 132° C. (2 mm.), and $n_D^{20}$ 1.5311. This hydrocarbon was nitrated with mixed acids, using the operating conditions given in Example XII above, to produce the pale-yellow, nearly colorless, ordorless dinitroderivative, 1,1-dimethyl-6-cyclohexyl-5,7-dinitroindan, having a melting point of 175–176° C.

This product shows activity as a plant-growth regulant and pre-emergence herbicide.

In similar manner various other compounds, also falling within the scope of this invention, may if desired be prepared. It has been found that herbicidal activity is demonstrated by products recovered from crude reaction products and that purification by way of recrystallization or other means is not essential.

We claim:

1. A method of controlling weeds comprising applying to the locus to be protected a herbicidally effective amount of a compound of the formula:

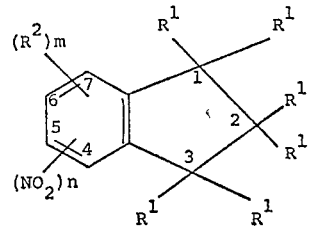

wherein $R^1$ is selected from the group consisting of hydrogen and alkyl radicals of from 1 to 3 total carbon atoms, with the proviso that at least one of the $R^1$'s is hydrogen, and further provided that if dimethyl substitution occurs in both the 1 and 3 positions at least one of the following conditions must prevail:

(a) at least one alkyl substituent having from 2 to 3 carbon atoms in the 2 position, and (b) an alkyl substituent having from 2 to 5 carbon atoms in the 5 position;

$R^2$ is selected from the group consisting of hydrogen and alkyl radicals of from 1 to 5 total carbon atoms; $n$ is an integer of 0 to 2; $m$ is an integer of 1 to 4, and where $m$ plus $n$ is a maximum of 4.

2. A method of claim 1 wherein the compound is 1,1,4,5-tetramethyl-7-isopropylindan.

3. A method of claim 1 wherein the compound is 1,1-dimethyl-4,6,7-triisopropylindan.

4. A method of claim 1 wherein the compound is 1,1,4,6-tetramethyl-5,7-dinitroindan.

5. A method of claim 1 wherein the compound is 1,1,3,3,5-pentamethyl-2-ethyl-4,6-dinitroindan.

6. A method of claim 1 wherein the compound is 1,1,3,3-tetramethyl-5-ethyl-4,6-dinitroindan.

References Cited

UNITED STATES PATENTS

| | | | |
|---|---|---|---|
| 3,152,192 | 10/1964 | Wood et al. | 260—668 |
| 3,240,829 | 3/1966 | Wood et al. | 260—668 |
| 3,283,016 | 11/1966 | Wood et al. | 11—2.3 |

FOREIGN PATENTS 796,130  6/1958  England.

LEWIS GOTTS, *Primary Examiner.*

G. HOLLRAH, *Assistant Examiner.*